(12) United States Patent
Anderson

(10) Patent No.: US 10,906,641 B1
(45) Date of Patent: Feb. 2, 2021

(54) SYSTEM AND METHOD FOR RELEASING UAVS FROM AN AIRBORNE VEHICLE

(71) Applicant: Charles M. Anderson, Valencia, CA (US)

(72) Inventor: Charles M. Anderson, Valencia, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 427 days.

(21) Appl. No.: 15/947,261

(22) Filed: Apr. 6, 2018

(51) Int. Cl.
   *B64C 39/02* (2006.01)
   *B64C 3/26* (2006.01)

(52) U.S. Cl.
   CPC ............ *B64C 39/024* (2013.01); *B64C 3/26* (2013.01); *B64C 2201/182* (2013.01); *B64C 2201/206* (2013.01)

(58) Field of Classification Search
   CPC ............ B64C 2201/20; B64C 2201/00; B64C 2201/082; B64C 2201/08; B64C 2201/206; B64C 2201/206; B64D 1/02; B64D 5/00; B64D 1/08; B64D 1/10; B64D 1/12; B64F 1/04; F42B 14/00; F42B 12/56; F42B 12/70; G01W 1/08
   See application file for complete search history.

(56) References Cited

U.S. PATENT DOCUMENTS

2016/0355261 A1* 12/2016 Chin ..................... B64C 39/024

\* cited by examiner

*Primary Examiner* — Philip J Bonzell
*Assistant Examiner* — Cindi M Curry
(74) *Attorney, Agent, or Firm* — Tarolli, Sundheim, Covell & Tummino LLP

(57) ABSTRACT

A system for releasably retaining at least one UAV in an aircraft includes a support member connected to the aircraft and extending through a passage. At least one boom is secured to the support member. Each boom has an expanded condition preventing the UAV from exiting the passage and a collapsed condition allowing the UAV to exit the passage in the wing.

18 Claims, 8 Drawing Sheets

SYSTEM AND METHOD FOR RELEASING UAVS FROM AN AIRBORNE VEHICLE

TECHNICAL FIELD

The present invention relates generally to aircraft systems and, more specifically, relates to an unmanned aerial vehicle (UAV) release system.

SUMMARY

An example system for releasably retaining at least one UAV of an aircraft includes a support member connected to the aircraft and extending through a passage in the aircraft. At least one boom is secured to the support member. Each boom has an expanded condition preventing the UAV from exiting the passage and a collapsed condition allowing the UAV to exit the passage.

In another example, an UAV release and recover system for an aircraft wing includes at least one UAV. A support member is connected to the aircraft and extends through a passage in the wing. The support member extends through each UAV. At least one boom is secured to the support member. Each boom has an expanded condition preventing the UAV from exiting the passage in the wing and a collapsed condition allowing the UAV to exit the passage in the wing. An actuating member is connected to each boom and movable relative to the support member to place each boom in the expanded and collapsed conditions.

In another aspect, a method of releasably retaining at least one UAV in a wing of an aircraft includes providing the at least one UAV along a support member within a passage of the wing. At least one boom is secured to the support member. Each boom is expanded to prevent the at least one UAV from exiting the passage in the wing. Each boom is collapsed to allow the at least one UAV to exit the passage in the wing to be released from the aircraft.

Other objects and advantages and a fuller understanding of the invention will be had from the following detailed description and the accompanying drawings.

DETAILED DESCRIPTION

Figure 1:
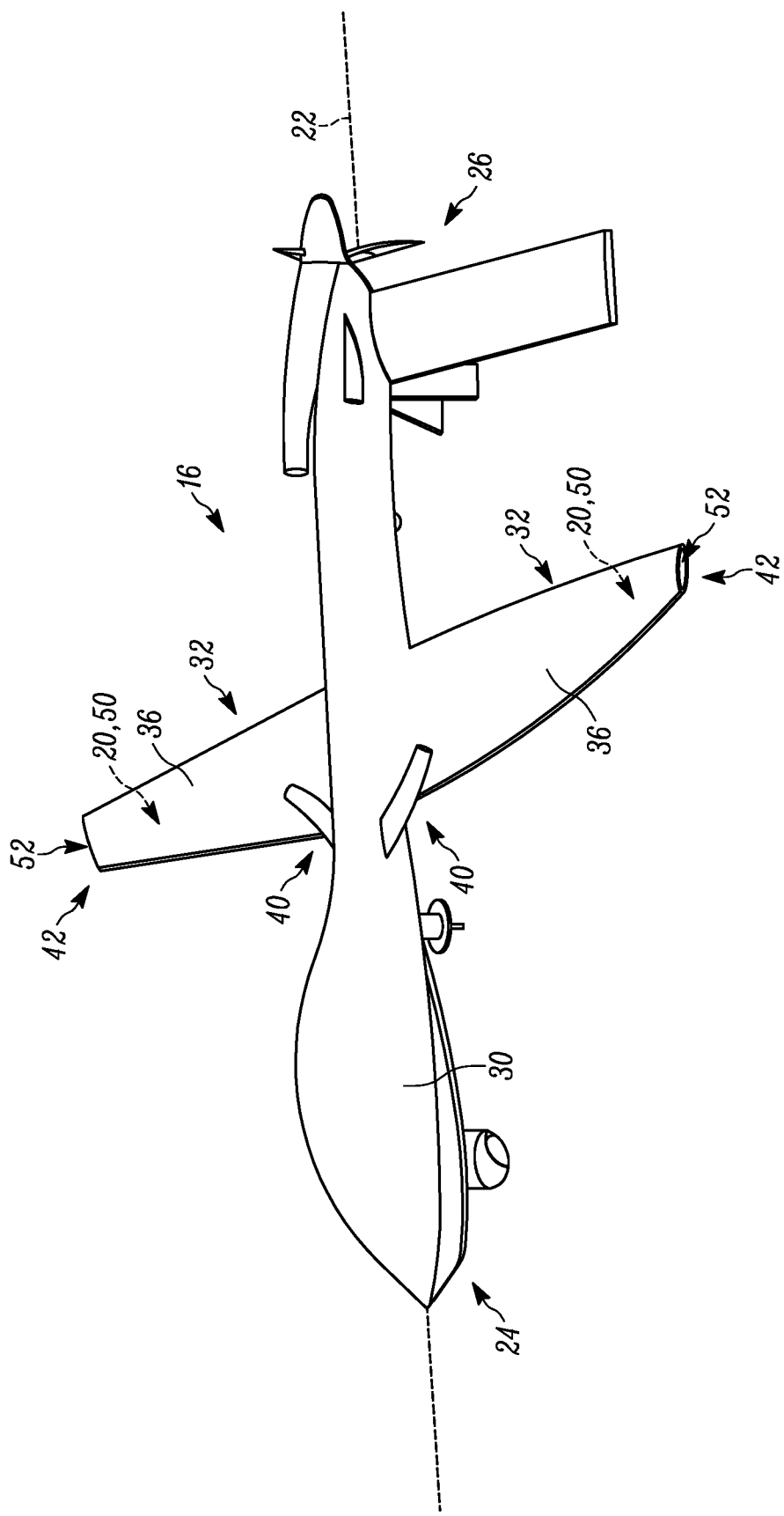
FIG. 1 is a schematic illustration of an aircraft including an example UAV release system.

The present invention relates generally to aircraft systems and, more specifically, relates to an unmanned aerial vehicle (UAV) release system. FIG. 1 illustrates an aircraft 16 including an example UAV release system 20. The aircraft 16 extends from a first or fore end 24 to a rear or aft end 26. The aircraft 16 includes a fuselage 30 extending generally along a centerline 22.

Figure 2:
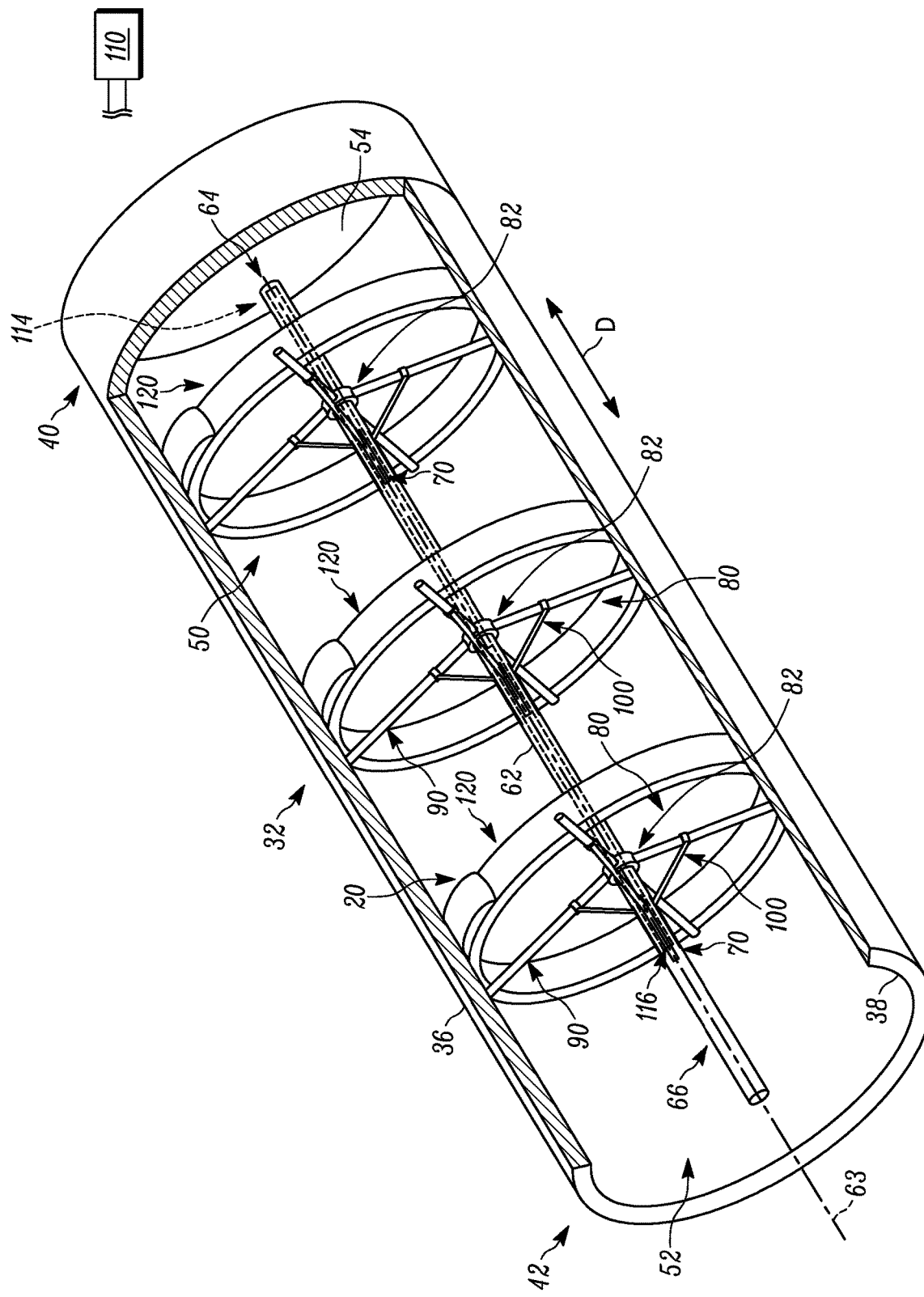
FIG. 2 illustrates an enlarged view the interior of a wing of the aircraft of FIG. 1.

A pair of wings 32 extends from the fuselage 30 on opposite sides of the centerline 22. Referring further to FIG. 2, each wing 32 is hollow and includes an exterior surface 36 and an interior surface 38. Each wing 32 extends from a first end 40 connected to the fuselage 30 to a free second end 42. The interior surface 38 defines a passage 50 extending along the length of the wing 32 from an opening 52 at the second end 42 to an end surface 54 adjacent or closer to the first end 40. The passage 50 can have a round, e.g., oval or circular, cross-section, or another cross-section, such as D-shaped.

The release system 20 includes a support member 62 that extends within the passage 50 along a centerline 63 from a first end 64 secured to the end surface 54 to a second end 66. The second end 66 can be adjacent to the second end 42 of the wing 32 or adjacent to the opening 52 in the wing. In one example, the support member 62 is cylindrical. A passage 68 (FIGS. 3A-3B) extends longitudinally within the support member 62 from the first end 64 towards the second end 66. The passage 68 can extend the entire length of the support member 62. An actuating member 112 is positioned within the passage 68 and is movable along the axis 63 relative to the support member 62. The actuating member 112 extends from a first end 114 to a second end 116.

Figure 3A:
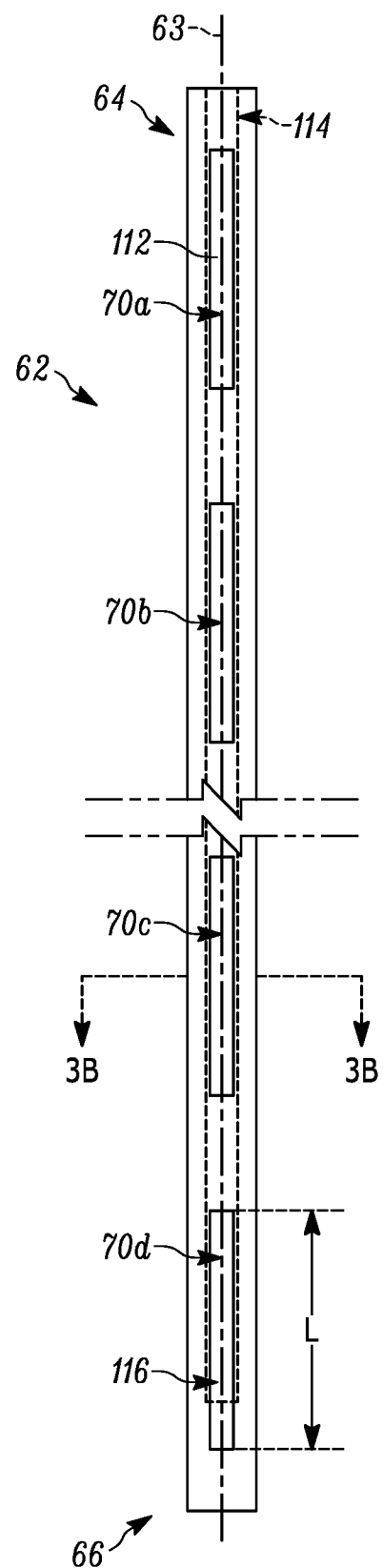
FIG. 3A is a front view of a support member and actuating member of the UAV release system.
Figure 3B:
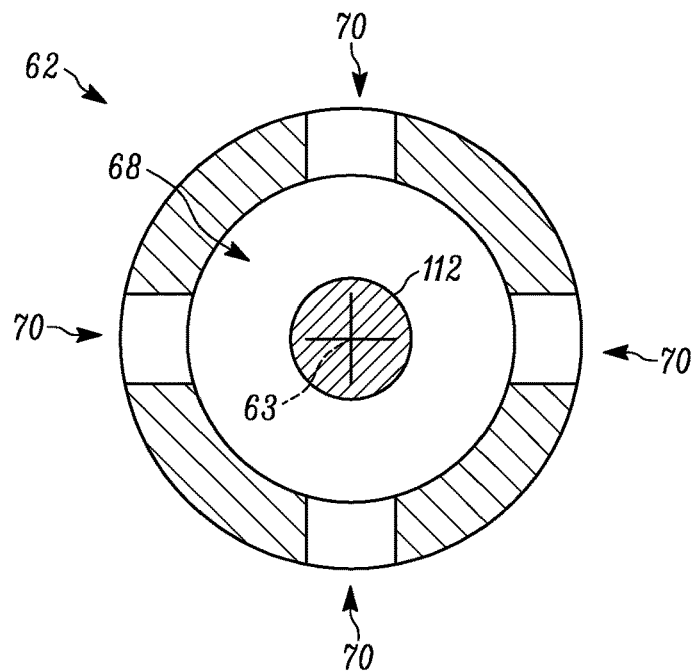
FIG. 3B is a section view taken along line 3B-3B of FIG. 3A.
Figure 4:
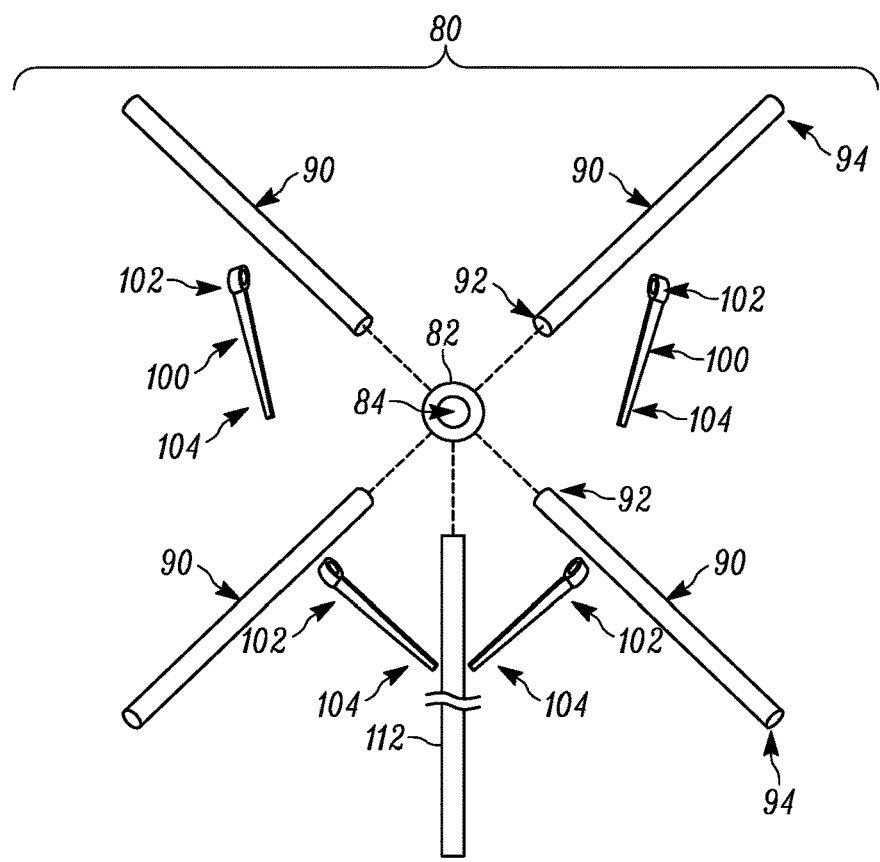
FIG. 4 is an exploded view of a boom for the UAV release system.

Slots 70 extend radially through the support member 62 to the passage 68. The slots 70 are symmetrically arranged around the axis 63 in a circumferential pattern. Groups of slots 70 are spaced along the length of the support member 62. As shown in FIG. 3A, four groups of four slots 70 (designated 70a-70d for clarity) are provided at spaced-apart locations along the support member 62. Each slot 70 is rectangular has a predetermined length L extending along the length of the support member 62. More or fewer groups of slots 70 having more or fewer slots in each group are contemplated. Asymmetrically arranged slots 70 are also contemplated.

One or more booms 80 are secured to the support member 62 (see also FIG. 2). Each boom 80 includes a base 82 having an opening 84 through which the support member 62 extends. The base 82 is rigidly fixed to the support member 60. Arms 90 are connected to the base 82 and extend outward therefrom. More specifically, each arm 90 includes a first end 92 pivotably connected to the base 82 and a second end 94. The arms 90 can be symmetrically (as shown) or asymmetrically (not shown) arranged about the base 82. Regardless, the arms 90 have the same arrangement about the base 82 as the arrangement of the slots 70 about the support member 62. The number and circumferential spacing of the arms 90 about the base 82 in each boom 80 corresponds with the number and circumferential spacing of the slots 70 about support member 62 in each group.

A tensioning or tethering member 100 is secured to each arm 90 between the ends 92, 94. The tensioning member 100 includes a first end 102 pivotably or slidably connected to the arm 90. Each tensioning member 100 extends through one of the slots 70 and has a second end 116 pivotably connected to the actuating member 112.

Returning to FIG. 2, the booms 80 are assembled on the support member 62 such that the support member extends through the openings 84 in the bases 82 and is fixed thereto. The arms 90 extend radially outward from the base 82 and support member 62. The actuating member 112 extends within the passage 68 of the support member 62. The first end 114 is positioned adjacent to the surface 54. The second end 116 is positioned adjacent to the second end 66.

A linear actuator 110 is connected to the first end 114 of the actuating member 112. The linear actuator 110 selectively moves the actuating member 112 longitudinally relative to the support member 62 in the manner D. Instead of a single actuating member 112 being connected to every boom 80 via the arms 90 and tensioning members 100, it will be appreciated that each boom could be connected to a separate actuating member within the support member 62 (not shown). In such a construction, each actuating member 112 can have an associated linear actuator 110 for individually controlling movement of each actuating member in the manner D (not shown).

Figure 5A:
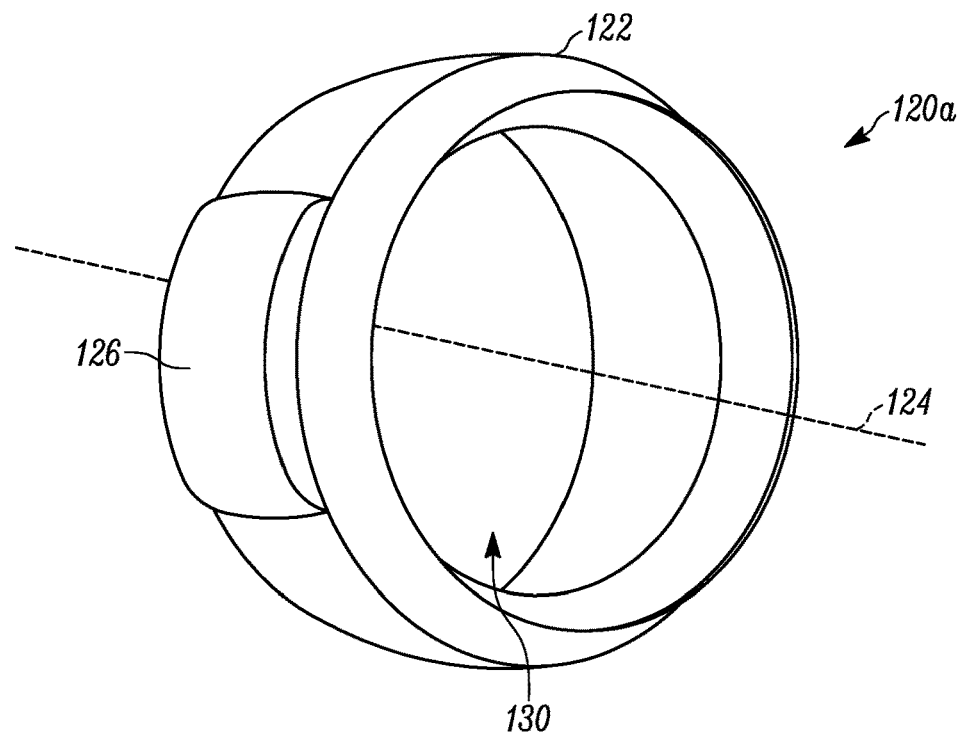
FIGS. 5A-5B are views of a first example UAV.
Figure 5B:
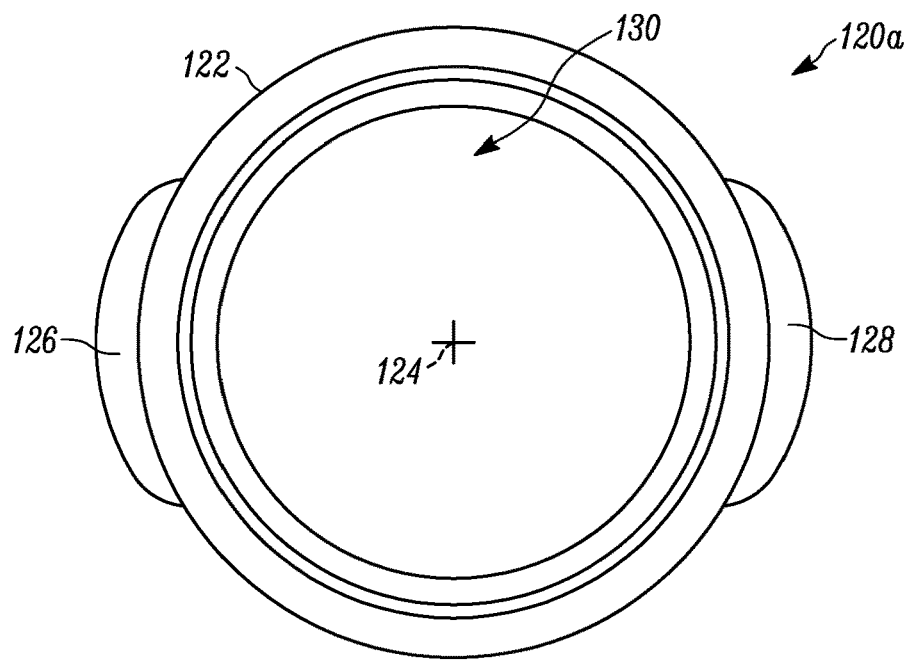

A UAV referenced generally as 120 is associated with each boom 80 and provided on the support member 62. As shown in FIGS. 5A-5B, one example UAV 120a is hollow and includes a round, e.g., elliptical, oval or circular, base 122 extending along and about a centerline 124. A pair of projections 126 extends radially outward from the base. A passage 130 extends entirely through the UAV 120a. The UAV 120a is made from a resilient material that is elastically deformable.

Figure 6A:
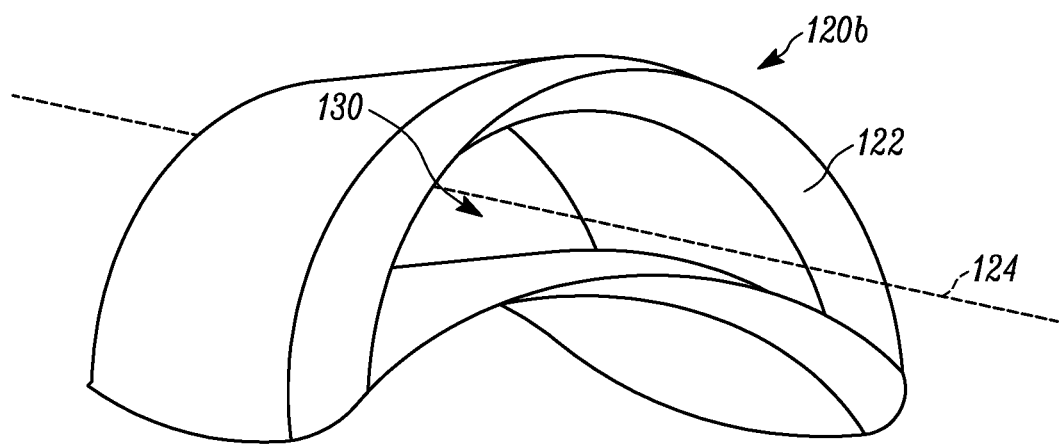
FIGS. 6A-6B are views of a second example UAV.
Figure 6B:
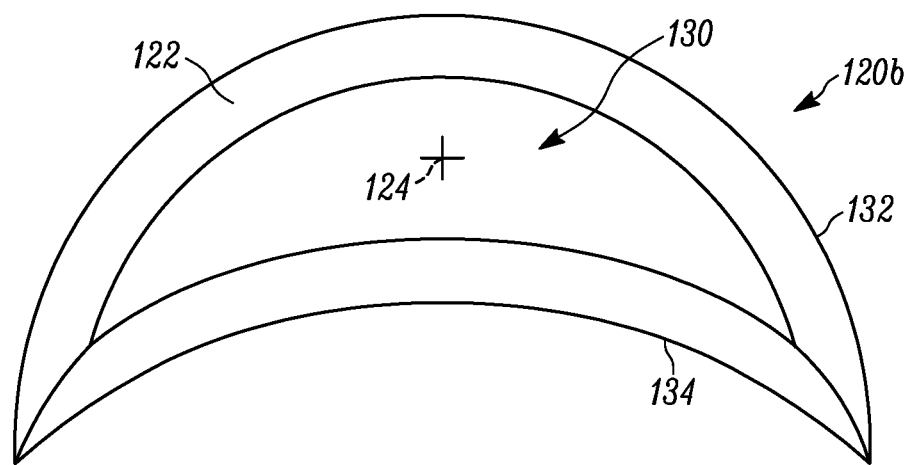

In another example shown in FIGS. 6A-6B, the UAV 120b is hollow and includes a crescent or generally D-shaped base 122 extending along a centerline 124. The base 122 includes a first curved portion 132 and a second curved portion 134. The portions 132, 134 can have the same or different curvatures from one another. As shown, the first portion 132 is convex and the second portion 134 is concave. A passage 130 extends entirely through the UAV 120b. The UAV 120b is made from a resilient material that is elastically deformable.

One or more telecommunications devices, sensors, etc. can be secured to or provided on either UAV 120. The UAV 120 is configured to frictionally engage the interior surface 38 of the wing 30—via the projections 126 or curved first portion 132—to help mitigate relative movement between the UAV and the wing until/unless desired.

Figure 7A:
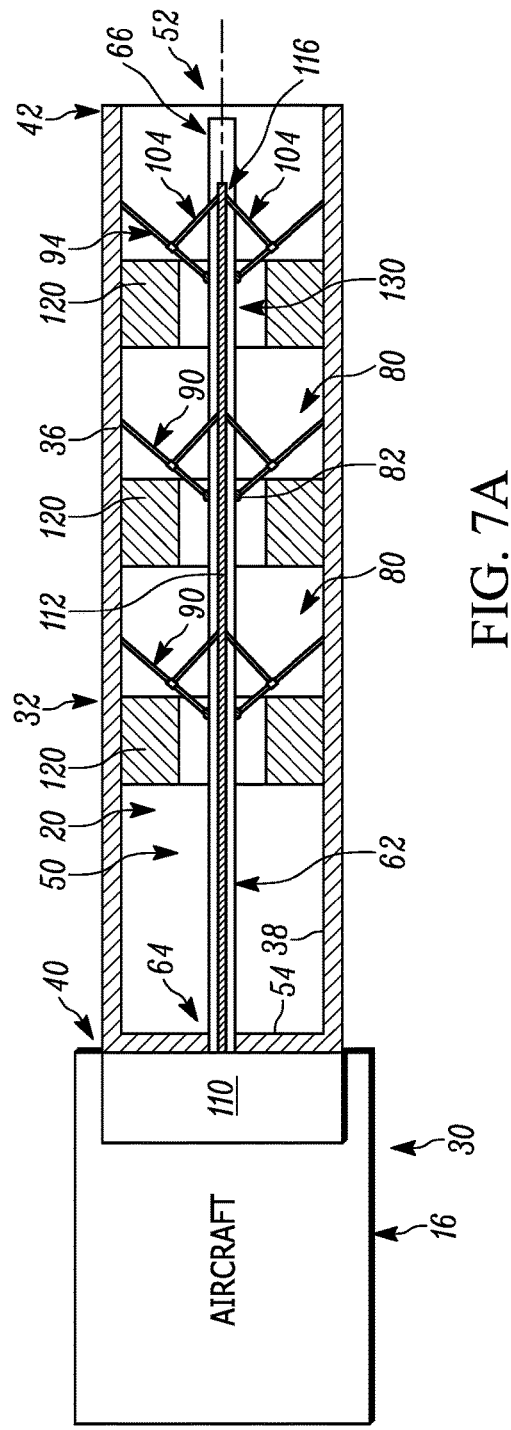
FIG. 7A is a schematic illustration of the UAV release system in a first condition storing UAVs.

Referring to FIG. 7A, multiple booms 80 with associated UAVs 120 are positioned along the support member 62 extending within the wing 32. When the UAV 120a is used the interior surface 38 and wing passage 50 are round. When the UAV 120b is used the interior surface 38 and wing passage 50 are D-shaped. In any case, the booms 80 have the initial position shown in which the arms 90 are expanded away from the support member 62. As a result, the expanded arms 90 retain the UAVs 120 on the support member 62 and prevent the UAVs from moving longitudinally along the support member relative to the wing 32.

When the arms 90 are expanded the second ends 94 are adjacent to or engage the interior surface 38 of the wing 32. In any case, the arms 90 are expanded to a footprint/diameter that is larger than the size of the passages 130 in the UAVs 120. As a result, the UAVs 120 are prevented from sliding or passing over the expanded arms 90 towards the opening 52. Consequently, the UAVs 120 are kept in a stored condition within the passage 50 while the booms 80 are expanded. This is desirable, for example, when the aircraft 16 is on the ground and during takeoff or landing.

When the aircraft 16 is in flight, it may be desirable to release one or more of the UAVs 120 to conduct unmanned surveillance, weather monitoring, etc. To this end, the linear actuator 110 is actuated to release one or more of the UAVs 120 from the passage 50 of the wing 32. In one example, the linear actuator 110 is actuated to move the actuating member 112 in the direction $D_1$ (FIG. 7B) relative to the stationary support member 62. Since the tensioning members 100 are connected to the actuating member 112, moving the actuating member in the direction $D_1$ likewise moves the second ends 104 of the tensioning members in the direction $D_1$.

Figure 7B:
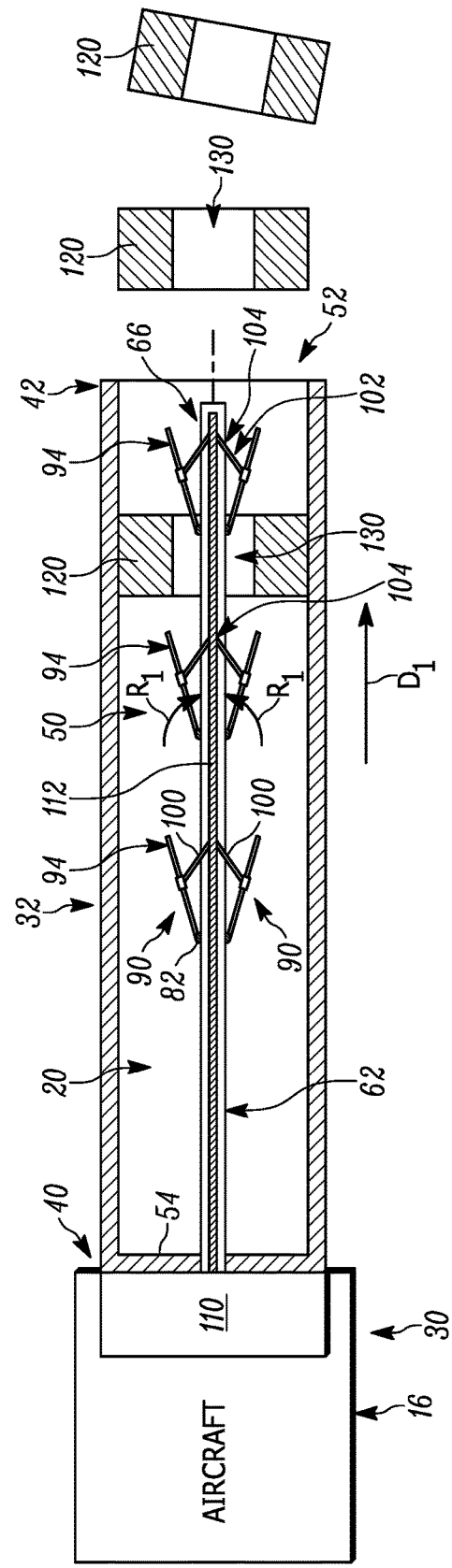
FIG. 7B is a schematic illustration of the UAV release system in a second condition releasing UAVs.

The first ends 102, in turn, move the arms 90 toward the support member 62. As shown in FIG. 7B, the arms 90 are pivoted radially inwards in the direction $R_1$ towards the support member 62 to thereby collapse the arms.

When the arms 90 reach a condition in which the footprint/diameter of the arms is smaller than the size of the passages 130 in the UAVs 120, the UAVs will slide over the booms 80 in the direction $D_1$. To this end, the length L of the slots 70 can be configured such that the tensioning members 100 reach an axial extent of the slot closer to the second end 66 of the support member 62 at the location where the UAVs 120 can slide over the booms 80. In any case, the sliding can occur automatically due to forces generated during flight, e.g., vibration, or an assist device (not shown) such as a pushing mechanism within the passage 50 can help to propel the UAVs 120 towards the opening 52 in the wing 32.

Regardless, each UAV 120 slides over the base 82 and arms 90 associated with each boom 80 positioned between the UAV and the opening 52. In other words, the rightmost UAV 120 (as shown in FIG. 7B) slides over a single boom 80 [closest to the opening 52] and the leftmost UAV slides over all three booms. In each instance, the UAV 120 slides over and relative to the support member 62 within the passage 50 in the wing 32. Ultimately, each UAV 120 passes through the opening 52 in the wing 32 and separates from the aircraft 16. At this point, the UAV 120 can be remotely piloted to a desired location to conduct surveillance, collect data, etc. The booms 80 are retained in the collapsed/release condition.

Although the UAV release system 20 is described as simultaneously releasing UAVs 120, it will be appreciated that multiple linear actuators 110 can be provided in the aircraft 16 or the UAV release system otherwise configured to individually release the UAVs as needed. In such a construction, some booms 80 are placed in the release condition and some remain in the expanded condition. Consequently, some UAVs 120 are expelled from the wing 32 and some UAVs remain retained therein in a secure manner.

Figure 8:
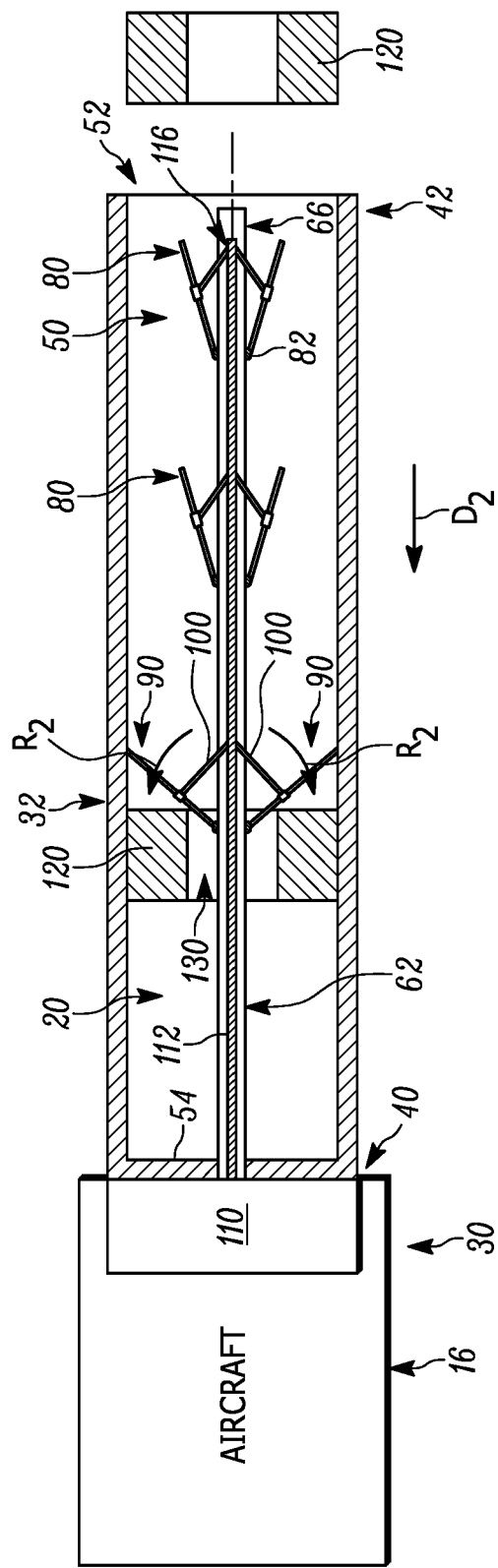
FIG. 8 is a schematic illustration of the UAV release system recovering UAVs.

Referring to FIG. 8, when it is desirable to retrieve or recover one or more of the released UAVs 120, the aircraft 16 and UAV coordinate/cooperate to position the UAV adjacent to and aligned with the opening 52 in the wing 32. While the booms 80 are maintained in the collapsed/release condition, each UAV 120 is steered or otherwise allowed to pass through the opening 52 into the passage 50 in the direction $D_2$. The first UAV 120 is oriented such that the passage 130 is aligned with the passage 50 in the wing 32. The first UAV 120 moves into the passage 50 with the support member 62 extending through the passage 130 to allow the UAV 120 to pass over the booms 80 until the last collapsed boom is reached, i.e., the first "open" boom capable of receiving an UAV.

A sensor (not shown) can determine that the first UAV 120 has longitudinally passed beyond the base 82 of the boom 80 closest to the fuselage 30. In response, the linear actuator 110 is actuated to move the actuating member 112 in the direction $D_2$ towards the fuselage 30. This likewise moves the tensioning members 100, causing the arms 90 to pivot outward into the expanded condition adjacent to or engaging the interior surface 38 of the wing 32. This retains the first UAV 120 within the passage 50. The process can then be repeated for each subsequent UAV 120 for which recapture is desired on the second boom 80, third boom, etc. until all the booms return to the expanded condition (see FIG. 7A). The length L of the slots 70 can be configured such that the tensioning members 100 reach an axial extent of the slot closer to the first end 64 of the support member 62 at the location where the arms 90 engage the interior surface 38.

Although the system 20 is shown and described herein as being provided in the wing 32 of the aircraft 16, it will be appreciated that the system could alternatively be provided in, for example, the fuselage 30 or an internal bay of the aircraft. In such cases, the end surface 54 and passage 50 shown in FIG. 2 would be provided in the fuselage 30 or internal bay. Consequently, the structure shown in FIG. 2 would be illustrating the fuselage or internal bay.

The preferred embodiments of the invention have been illustrated and described in detail. However, the present invention is not to be considered limited to the precise construction disclosed. Various adaptations, modifications and uses of the invention can occur to those skilled in the art to which the invention relates and the intention is to cover hereby all such adaptations, modifications, and uses which fall within the spirit or scope of the appended claims.

What is claimed is:

1. A system for releasably retaining multiple unmanned aerial vehicles (UAVs) in an aircraft, the system comprising:
   a support member connected to the aircraft and extending through a passage; and
   multiple booms secured to the support member, each boom having an expanded condition preventing one of the UAVs from exiting the passage and a collapsed condition allowing the respective UAV to exit the passage.

2. The system of claim 1 further comprising an actuating member connected to each boom and movable relative to the support member to place each boom in the expanded and collapsed conditions.

3. The system of claim 2 further comprising a linear actuator for moving the actuating member relative to the support member.

4. The system of claim 2, wherein movement of the actuating member in a first direction places each boom in the expanded condition and movement of the actuating member in a second direction opposite the first direction places each boom in the collapsed condition.

5. The system of claim 2, wherein each boom includes:
   a base connected to the support member;
   arms pivotably connected to the base; and
   a tensioning member connected to each arm and the actuating member for controlling movement of the arms relative to the base.

6. The system of claim 5, wherein the support member includes a longitudinal passage for receiving the actuating member and slots extending radially through the support member to the longitudinal passage, the tensioning members extending from the arms and through the radial slots to the actuating member.

7. The system of claim 5, wherein the base is fixed to the support member.

8. The system of claim 1, wherein the support member is connected to a surface of a wing of the aircraft and the passage extends within the wing.

9. A UAV release and recover system for an aircraft wing, comprising:
   at least one UAV provided in a passage in the wing;
   a support member connected to the aircraft and extending through the passage and each UAV;
   at least one boom secured to the support member, each boom having an expanded condition preventing each UAV from exiting the passage in the wing and a collapsed condition allowing each UAV to exit the passage in the wing; and
   an actuating member connected to each boom and movable relative to the support member to place each boom in the expanded and collapsed conditions.

10. The system of claim 9 further comprising a linear actuator for moving the actuating member relative to the support member.

11. The system of claim 9, wherein multiple booms are secured to the support member, each boom retaining a UAV within the passage of the wing.

12. The system of claim 9, wherein each boom includes:
    a base connected to the support member;
    arms pivotably connected to the base; and
    a tensioning member connected to each arm and the actuating member for controlling movement of the arms relative to the base.

13. The system of claim 12, wherein the support member includes a longitudinal passage for receiving the actuating member and slots extending radially through the support member to the longitudinal passage, the tensioning members extending from the arms and through the radial slots to the actuating member.

14. The system of claim 9, wherein movement of the actuating member in a first direction places each boom in the expanded condition and movement of the actuating member in a second direction opposite the first direction places each boom in the collapsed condition.

15. The system of claim 9, wherein the UAV is hollow and formed from an elastically deformable material.

16. The system of claim 9, wherein the UAV includes projections for helping retain the UAV within the passage in the wing.

17. A method of releasably retaining at least one UAV in a wing of an aircraft, the method comprising:
    providing the at least one UAV along a support member within a passage of the wing;
    expanding at least one boom secured to the support member to prevent the at least one UAV from exiting the passage in the wing; and
    collapsing the boom to allow the at least one UAV to exit the passage in the wing to be released from the aircraft.

18. The method of claim 17 further comprising:
    passing the released UAV into the passage and over the boom; and
    expanding the boom to prevent the UAV from exiting the passage in the wing.

* * * * *